United States Patent
Osawa et al.

(10) Patent No.: US 10,295,424 B2
(45) Date of Patent: May 21, 2019

(54) OIL PRESSURE SENSOR ATTACHMENT STRUCTURE

(71) Applicant: Nidec Tosok Corporation, Zama-shi, Kanagawa (JP)

(72) Inventors: Tomoka Osawa, Zama (JP); Hironobu Wakabayashi, Zama (JP); Toshiaki Nakamura, Zama (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 21 days.

(21) Appl. No.: 15/807,907

(22) Filed: Nov. 9, 2017

(65) Prior Publication Data

US 2018/0143093 A1 May 24, 2018

(30) Foreign Application Priority Data

Nov. 18, 2016 (JP) ................................. 2016-224676

(51) Int. Cl.
 *G01L 19/00* (2006.01)
(52) U.S. Cl.
 CPC .................................. *G01L 19/003* (2013.01)
(58) Field of Classification Search
 CPC ............................ G01L 19/143; G01L 19/144
 See application file for complete search history.

(56) References Cited

U.S. PATENT DOCUMENTS

| 4,317,472 | A | * | 3/1982 | Zahid | F15B 1/165 138/30 |
| 4,680,569 | A | * | 7/1987 | Yamaki | G01L 19/0084 338/36 |
| 6,439,058 | B1 | * | 8/2002 | Aratani | G01L 19/003 73/754 |
| 7,152,483 | B2 | * | 12/2006 | Mast | G01L 19/0084 73/754 |
| 7,992,622 | B2 | * | 8/2011 | Newman | F01P 11/08 165/140 |
| 8,468,877 | B2 | * | 6/2013 | Molloy | F01M 11/0408 73/49.5 |
| 2004/0129085 | A1 | * | 7/2004 | Mundry | G01L 9/0051 73/726 |

(Continued)

FOREIGN PATENT DOCUMENTS

JP 2010-174991 A 8/2010
JP 2015-096843 A 5/2015

*Primary Examiner* — Nathaniel T Woodward
(74) *Attorney, Agent, or Firm* — Keating & Bennett, LLP

(57) ABSTRACT

An oil sensor attachment structure includes a guide projection disposed on an upper surface of an oil passage body and a sensor case. The guide projection includes a pair of first walls, a pair of first protrusions protruding toward each other, and a second wall. A receiving portion having a first receiving opening is provided between the first walls. The second wall faces the first receiving opening in a second direction with a gap therebetween. The sensor case includes a columnar portion, a flange protruding from the columnar portion, and a facing portion that is connected to the flange and that protrudes to a position above the flange. Each of the first protrusions has a first surface facing toward the other side in the second direction. The facing portion is disposed on the other side of the first surface in the second direction and faces the first surface.

7 Claims, 5 Drawing Sheets

(56) References Cited

U.S. PATENT DOCUMENTS

| | | | |
|---|---|---|---|
| 2006/0043789 A1* | 3/2006 | Dinkel | B60T 8/3675 |
| | | | 303/119.3 |
| 2009/0218168 A1* | 9/2009 | Diehl | F01M 11/0408 |
| | | | 184/1.5 |
| 2010/0186830 A1 | 7/2010 | Shigyo et al. | |
| 2015/0137281 A1* | 5/2015 | Imai | B81B 7/0051 |
| | | | 257/415 |

* cited by examiner

OIL PRESSURE SENSOR ATTACHMENT STRUCTURE

CROSS REFERENCE TO RELATED APPLICATIONS

This application claims the benefit of priority to Japanese Patent Application No. 2016-224676 filed on Nov. 18, 2016. The entire contents of this application are hereby incorporated herein by reference.

BACKGROUND OF THE INVENTION

1. Field of the Invention

The present invention relates to an oil pressure sensor attachment structure.

2. Description of the Related Art

Oil pressure controllers including an oil pressure sensor are known.

For example, Japanese Unexamined Patent Application Publication No. 2010-174991 describes an oil pressure controller in which an oil pressure sensor is attached to a control valve having an oil passage.

Such an oil pressure sensor can be attached to a control valve by using, for example, a method of attaching the oil pressure sensor to the control valve from the outside of the control valve. Examples of such a method include a method of forming a male thread on the oil pressure sensor and screwing the male thread of the oil pressure sensor into a female threaded hole formed in the control valve from the outside of the control valve; and a method of fixing the oil pressure sensor to the control valve by using another attachment member.

In an oil pressure controller, a high pressure is applied to an oil pressure sensor from oil, whose pressure is to be measured. Therefore, it is necessary to attach the oil pressure sensor to the control valve with sufficiently high attachment strength. For this purpose, when using the aforementioned method of screwing the male thread of the oil pressure sensor into the female threaded hole of the control valve, it is necessary that the length over which the threaded portions engage with each other be sufficiently long, and therefore the size of the oil pressure sensor tends to increase. When using another attachment member, the size of the attachment member tends to increase in order to ensure sufficiently high attachment. Accordingly, exiting technologies have a problem in that the size of the entirety of an oil pressure controller tends to increase in order to ensure sufficiently high strength attachment strength of an oil pressure sensor.

Preferred embodiments of the present invention, which has been devised to solve the above problem, is to provide an oil pressure sensor attachment structure that can suppress increase in the size of the entirety of an oil pressure controller while ensuring sufficiently high attachment strength of an oil pressure sensor.

SUMMARY OF THE INVENTION

An oil pressure sensor attachment structure according an aspect of the present invention is an oil pressure sensor attachment structure for attaching an oil pressure sensor to an upper surface of an oil passage body having therein an oil passage in which oil flows, the oil pressure sensor measuring a pressure of oil that flows in the oil passage. The oil passage body has an oil passage opening, which is connected to the oil passage, in the upper surface of the oil passage body. The oil pressure sensor includes a sensor body and a sensor case that covers the sensor body. The sensor case includes a detection port in a lower surface thereof, the detection port being connected to the oil passage opening in a state in which the oil pressure sensor is attached to the upper surface of the oil passage body. The oil pressure sensor attachment structure includes a guide projection disposed on the upper surface of the oil passage body; and the sensor case. The guide projection includes a pair of first walls that protrude upward from the upper surface of the oil passage body and that face each other in a first direction with the oil passage opening therebetween, the first direction being a horizontal direction; and a pair of first protrusions each of which protrudes from a corresponding one of the first walls toward the other first wall and that face each other in the first direction with a gap therebetween. A receiving portion is provided between the first walls. The receiving portion includes a first receiving opening that is open toward one side in a second direction that is a horizontal direction perpendicular to the first direction, and the receiving portion is capable of receiving the sensor case from the first receiving opening in the second direction. The guide projection includes a second wall that protrudes upward from the upper surface of the oil passage body. The second wall faces the first receiving opening in the second direction with a gap therebetween and is disposed in such a way that the oil passage opening is located between the second wall and the first receiving opening. The sensor case includes a columnar portion that extends in an up-down direction and that is inserted into the gap between the first protrusions; a flange that protrudes from the columnar portion outward in a radial direction of the columnar portion, at least a part of the flange being disposed in the receiving portion between the upper surface of the oil passage body and the first protrusions; and a facing portion that is connected to the flange and protrudes to a position above the flange. Each of the first protrusions has a first surface that faces toward the other side in the second direction. The facing portion is disposed on the other side of the first surface in the second direction and faces the first surface.

The above and other elements, features, steps, characteristics and advantages of the present invention will become more apparent from the following detailed description of the preferred embodiments with reference to the attached drawings.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

In each of the figures, the Z-axis direction is the up-down direction Z. The X-axis direction is the left-right direction (first direction) X, which is a horizontal direction that is perpendicular to the up-down direction Z. The Y-axis direction is the front-back direction (second direction) Y, which is a horizontal direction that is perpendicular to the up-down direction Z and perpendicular to the left-right direction X. The positive side in the up-down direction Z will be referred to as the "upper side", and the negative side in the up-down direction Z will be referred to as the "lower side". The positive side in the front-back direction Y will be referred to as the "front side (the other side in the second direction)", and the negative side in the front-back direction Y will be referred to as the "back side (one side in the second direction)". As appropriate, adverbial expressions corresponding to these "sides", such as "upward", "downward", "forward", "backward", may be used. Note that the terms "upper side", "lower side", "front side", "back side", "up-down direction, "left-right direction", and "front-back direction" are only used to describe the relative positional relationships among components, and do not limit the actual positional relationships and the like among the components.

Figure 1:
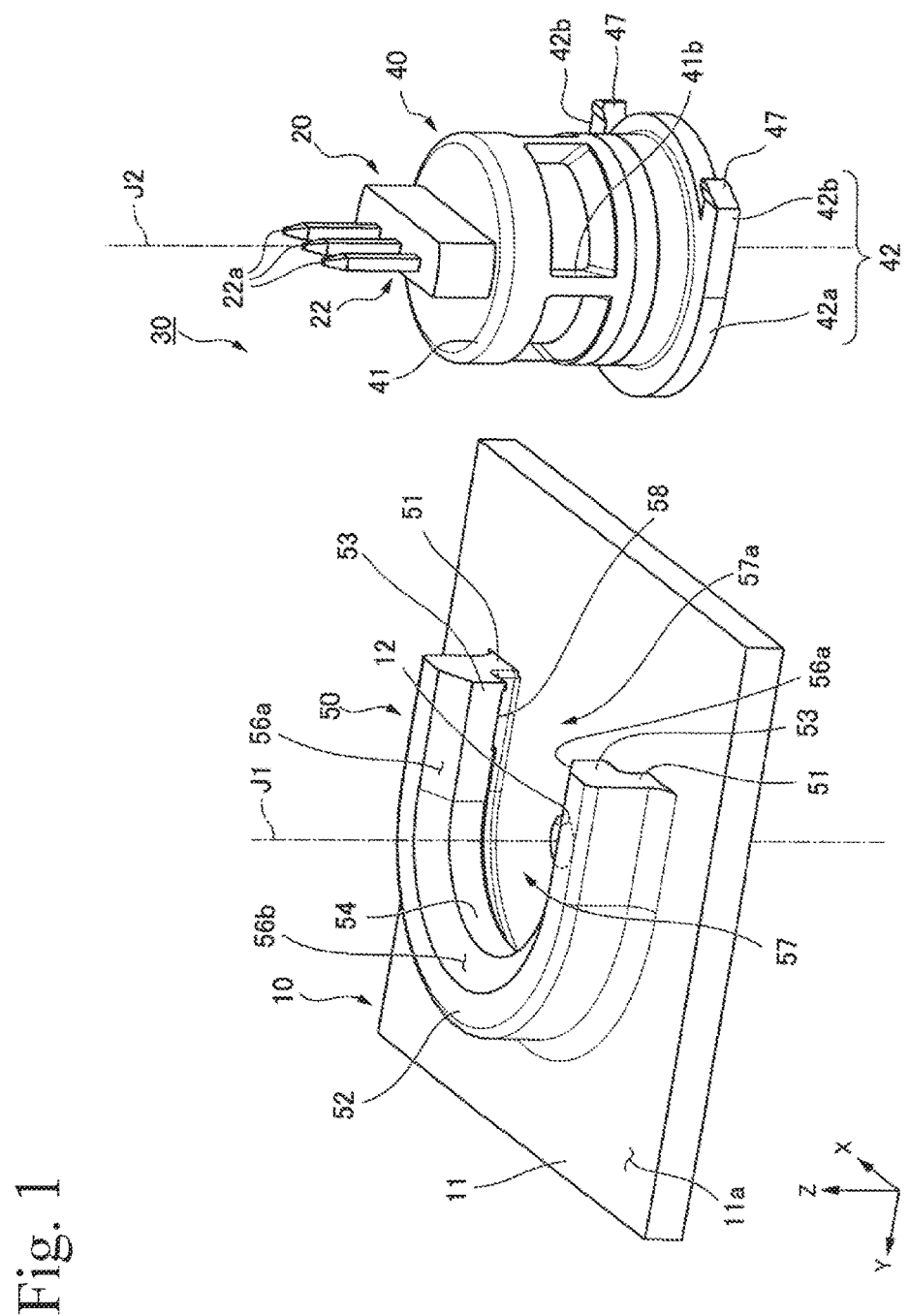
FIG. 1 is a perspective view of an oil pressure sensor attachment structure according to an embodiment.
Figure 2:
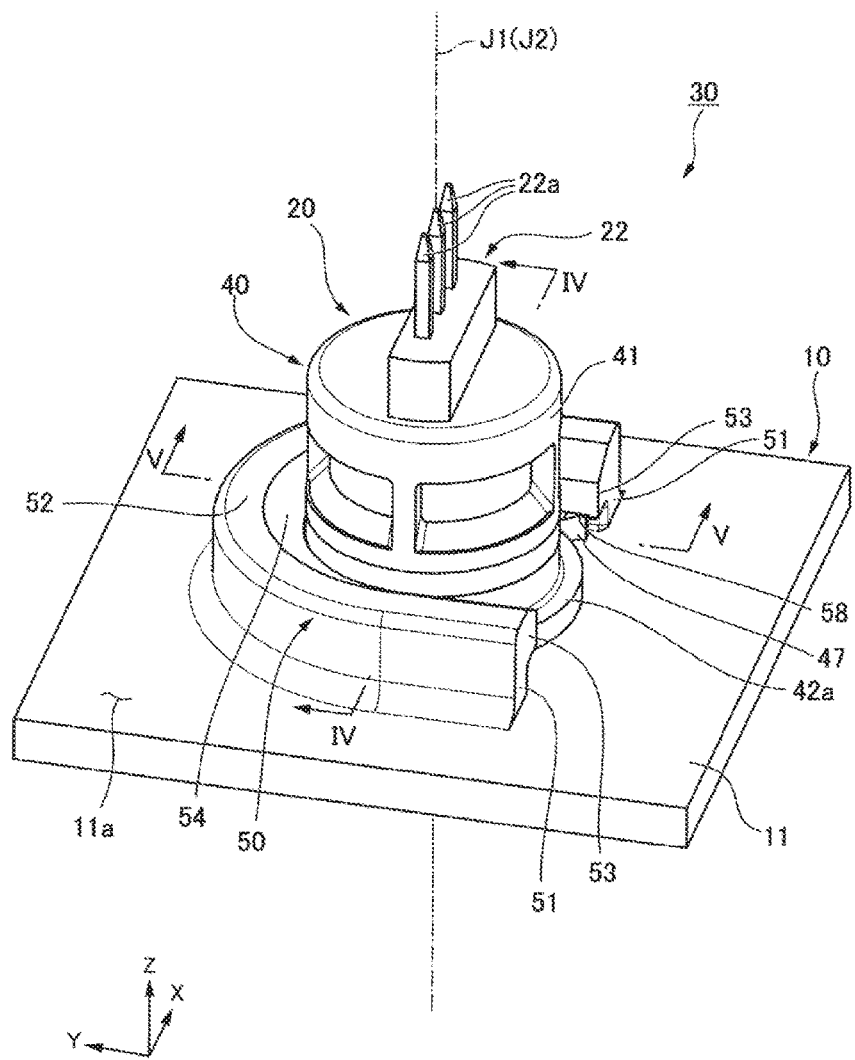
FIG. 2 is a perspective view of the oil pressure sensor attachment structure according to the present embodiment.
Figure 3:
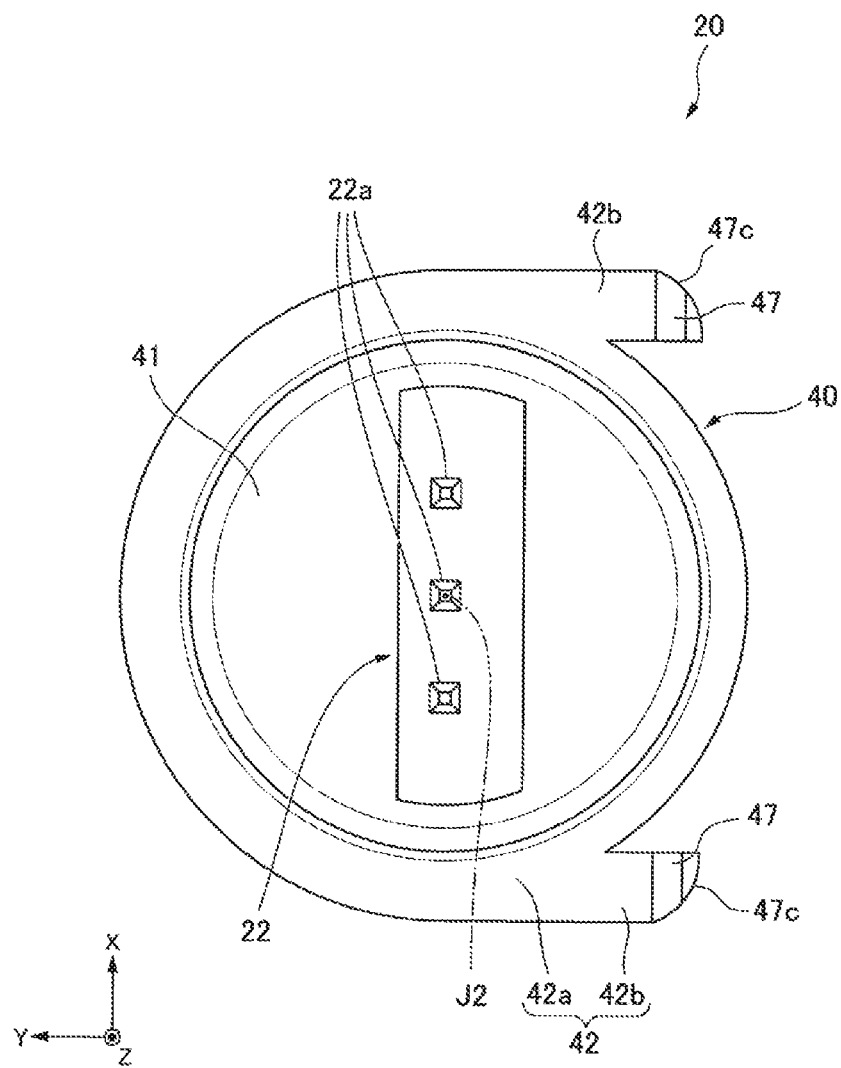
FIG. 3 is a plan view of the oil pressure sensor attachment structure according to the present embodiment, seen from above.
Figure 4:
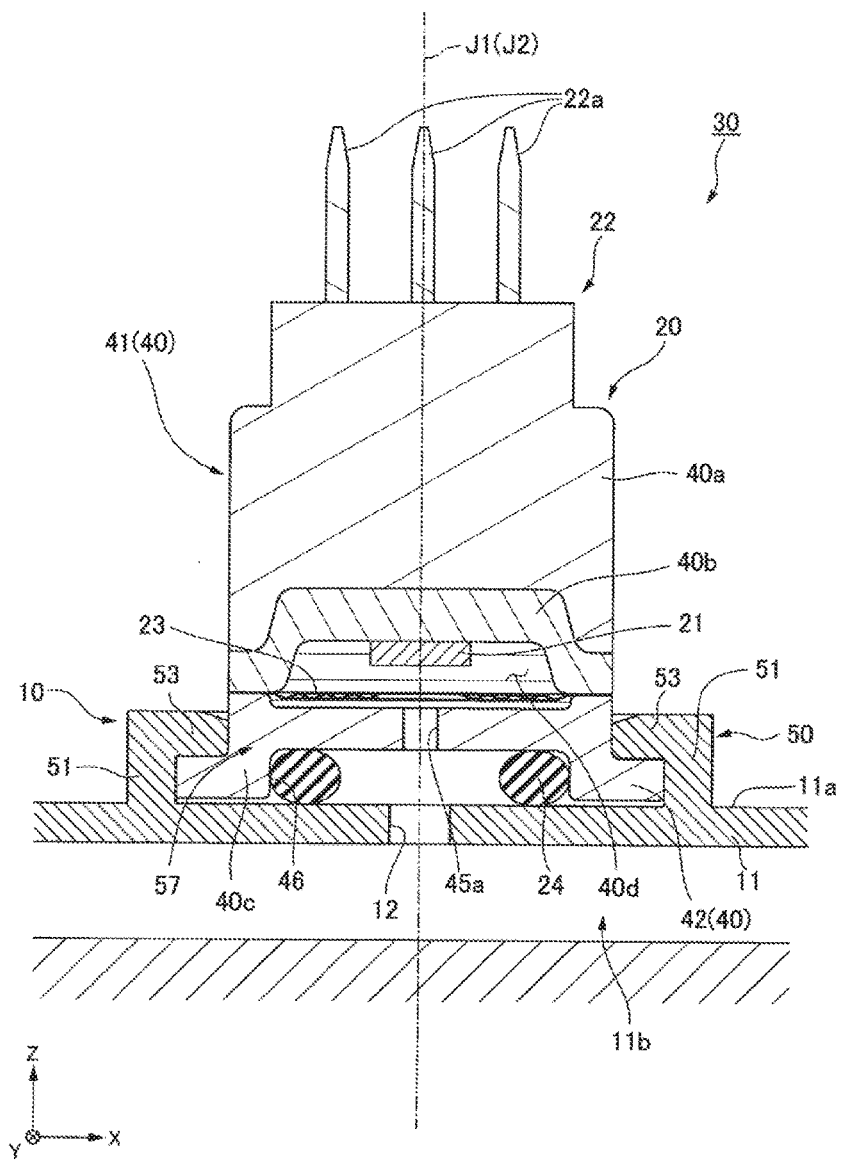
FIG. 4 is a sectional view of the oil pressure sensor attachment structure according to the present embodiment, taken along line IV-IV in FIG. 2.

FIGS. 1 to 4 illustrate an oil pressure sensor attachment structure 30 according to the present embodiment. The oil pressure sensor attachment structure 30 is used to attach an oil pressure sensor 20 to a control valve 10 of an oil pressure controller. To be specific, the oil pressure sensor attachment structure 30 is used to attach the oil pressure sensor 20 to an upper surface 11a of an oil passage body 11 of the control valve 10. As illustrated in FIG. 4, the oil passage body 11 has therein an oil passage 11b in which oil flows. The oil pressure sensor 20 measures the pressure of oil that flows in the oil passage 11b. The oil passage body 11 has an oil passage opening 12, which is connected to the oil passage 11b, in the upper surface 11a. As illustrated in FIG. 1, the oil passage opening 12 has a circular shape centered on a first central axis J1 extending in the up-down direction Z. In the following description, a side of an object nearer to the first central axis J1 in the left-right direction X will be referred to as the "inside in the left-right direction", and a side of the object farther from the first central axis J1 in the left-right direction X will be referred to as the "outside in the left-right direction".

FIG. 1 illustrates a state before the oil pressure sensor 20 is attached to the upper surface 11a of the oil passage body 11. FIGS. 2 and 4 illustrate a state in which the oil pressure sensor 20 is attached to the upper surface 11a of the oil passage body 11 by using the oil pressure sensor attachment structure 30. The state in which the oil pressure sensor 20 is attached to the upper surface 11a of the oil passage body 11 by using the oil pressure sensor attachment structure 30 will be referred to as the "attached state". The oil pressure sensor attachment structure 30 includes a guide projection 50 of the control valve 10, a sensor case 40 of the oil pressure sensor 20, and a sealing member 24 of the oil pressure sensor 20.

As illustrated in FIG. 1, the guide projection 50 is disposed on the upper surface 11a of the oil passage body 11. The guide projection 50 includes a pair of first walls 51, a second wall 52, a pair of first protrusions 53, and a second protrusion 54. The pair of first walls 51 protrude upward from the upper surface 11a of the oil passage body 11. The pair of first walls 51 face each other in the left-right direction X, which is a horizontal direction, with the oil passage opening 12 therebetween. The pair of first walls 51 extend parallel to each other in the front-back direction Y.

The second wall 52 protrudes upward from the upper surface 11a of the oil passage body 11. The second wall 52 connects front end portions of the pair of first walls 51. The second wall 52 extends in the circumferential direction around the first central axis J1. When seen from above, the second wall 52 is shaped like a semi-circular arc that is convex forward. The pair of first walls 51 and the second wall 52 are connected, so that a U-shaped wall that is open backward is formed.

As illustrated in FIG. 4, each of the pair of first protrusions 53 protrudes from a corresponding one of the first walls 51 toward the other first wall 51. To be specific, the first protrusions 53 protrude from the upper ends of the first walls 51 inward in the left-right direction. The pair of first protrusions 53 of the first walls 51 face each other in the left-right direction X with a gap therebetween. As illustrated in FIG. 1, the first protrusions 53 extend from back ends to front ends of the first walls 51 in the front-back direction Y.

Upper surfaces of the first protrusions 53 are first inclined surfaces 56a. The first inclined surfaces 56a are flat inclined surfaces that rise from the inside in the left-right direction toward the outside in the left-right direction. The first inclined surfaces 56a extend from the back ends to the front ends of the first protrusions 53 in the front-back direction Y. The first inclined surfaces 56a face upward and inward in the left-right direction. Inner end portions of the first inclined surfaces 56a in the left-right direction are located below the upper ends of the first walls 51 in the up-down direction Z and are located at the same positions as inner end portions of the first protrusions 53 in the left-right direction X. Outer end portions of the first inclined surfaces 56a in the left-right direction are located at the same positions as upper surfaces of the first walls 51 in the up-down direction Z.

Figure 5:
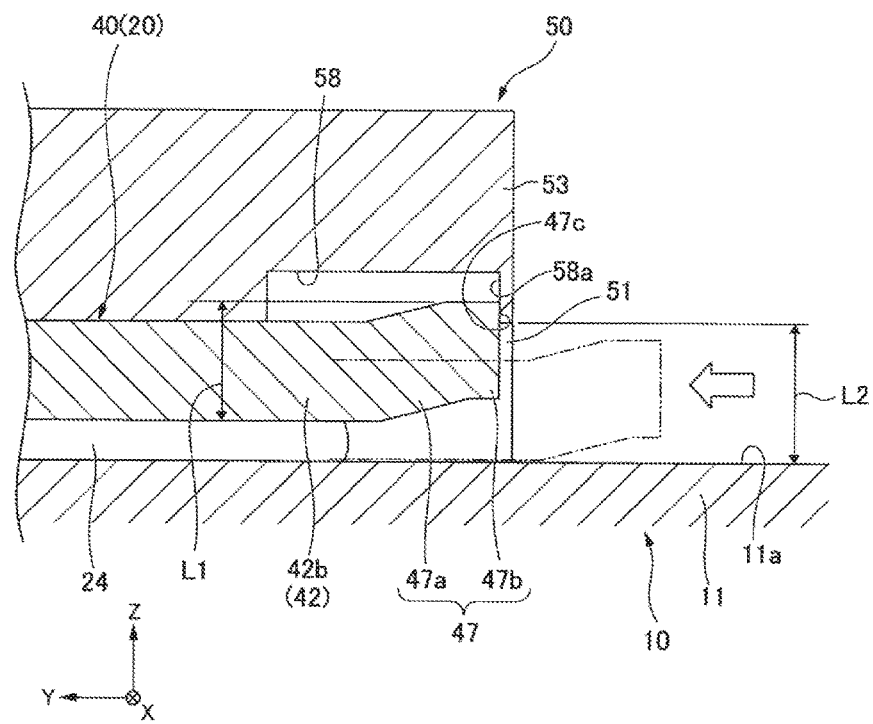
FIG. 5 is a partial sectional view of the oil pressure sensor attachment structure according to the present embodiment, taken along line V-V in FIG. 2.

Each of the first protrusions 53 has a recess 58 that is recessed upward from the lower surface of the first protrusion 53. The recess 58 is formed in a back part of the first protrusion 53. The recess 58 is disposed further forward than the back end of the first protrusion 53. The recess 58 extends in the front-back direction Y. The recess 58 is open inward in the left-right direction. As illustrated in FIG. 5, the first protrusion 53 has a first surface 58a facing forward. In the present embodiment, the first surface 58a is an inner side surface of the recess 58 facing forward. The first surface 58a is perpendicular to the front-back direction Y. The recess 58 is disposed in each of the pair of first protrusions 53. That is, the first surface 58a is disposed in each of the pair of first protrusions 53.

As illustrated in FIG. 1, the second protrusion 54 protrudes from the second wall 52 backward, that is, in the front-back direction Y toward a first receiving opening 57a (described below). To be specific, the second protrusion 54 protrudes backward from the upper end of the second wall 52. The second protrusion 54 extends from one end to the other end of the second wall 52 in an arc-like shape in a circumferential direction around the first central axis J1. The second protrusion 54 connects front end portions of the pair of first protrusions 53 to each other.

An upper surface of the second protrusion 54 is a second inclined surface 56b. The second inclined surface 56b is a flat inclined surface that rises from the back side toward the front side. The second inclined surface 56b extends from one end to the other end of the second protrusion 54 in the circumferential direction around the first central axis J1. The second inclined surface 56b faces upward and backward. A back end portion of the second inclined surface 56b is located below the upper end of the second wall 52 in the up-down direction Z and is located at the same position as a back end portion of the second protrusion 54. A front end portion of the second inclined surface 56b is located at the same position as the upper surface of the second wall 52 in the up-down direction Z. Both ends of the second inclined surface 56b in the circumferential direction are respectively connected to the first inclined surfaces 56a.

A receiving portion 57 is provided between the first walls 51. In the present embodiment, the receiving portion 57 is a space that is inside the guide projection 50 and that is surrounded by the first walls 51, the second wall 52, the first protrusions 53, and the second protrusion 54. The receiving portion 57 includes the first receiving opening 57a, which is open backward. The second wall 52 faces the first receiving opening 57a with a gap therebetween in the front-back direction Y and is disposed in such a way that the oil passage opening 12 is located between the second wall 52 and the first receiving opening 57a. The receiving portion 57 can receive the sensor case 40 from the first receiving opening 57a in the front-back direction Y. The receiving portion 57 is open upward.

As illustrated in FIG. 4, the oil pressure sensor 20 includes the sensor case 40, a sensor body 21, a connection terminal 22, a diaphragm 23, and the sealing member 24. The sensor case 40 covers the sensor body 21. As illustrated in FIG. 1, the sensor case 40 includes a columnar portion 41, a flange 42, and facing portions 47.

The columnar portion 41 extends in the up-down direction Z. In the present embodiment, the columnar portion 41 has a cylindrical shape that extends in the up-down direction Z and that is centered on the second central axis J2. As illustrated in FIGS. 2 and 4, in the attached state, the second central axis J2 coincides with the first central axis J1. As illustrated in FIG. 1, a plurality of grooves 41b are formed in the outer peripheral surface of the columnar portion 41 so as to be recessed inward in the radial direction centered on the second central axis J2. The grooves 41b extend in the circumferential direction around the second central axis J2. The grooves 41b are arranged in the circumferential direction around the second central axis J2.

As illustrated in FIG. 4, the columnar portion 41 includes a sealing recess 46 that is recessed upward from the lower surface of the columnar portion 41. When seen from below, the sealing recess 46 has a circular shape centered on the second central axis J2. A detection port 45a, which is connected to an accommodation space 40d (described below), is formed at the center of the bottom surface of the sealing recess 46. That is, the sensor case 40 has the detection port 45a in the lower surface thereof. The detection port 45a is a hole that extends through a lower case 40c (described below) in the up-down direction Z. In the state in which the oil pressure sensor 20 is attached to the upper surface 11a of the oil passage body 11, the detection port 45a is connected to the oil passage opening 12.

The sealing member 24 is disposed in the sealing recess 46. The sealing member 24 is disposed between the upper surface 11a of the oil passage body 11 and the sensor case 40. The sealing member 24 seals a gap between the upper surface 11a of the oil passage body 11 and the sensor case 40. The sealing member 24 has elasticity. In the present embodiment, the sealing member 24 is an O-ring having an annular shape centered on the second central axis J2. An outer peripheral surface of the sealing member 24 is in contact with an inner peripheral surface of the sealing recess 46. In the attached state, the sealing member 24 is in contact with the upper surface 11a of the oil passage body 11 and the bottom surface of the sealing recess 46. In the attached state, the sealing member 24 is compressed and elastically deformed in the up-down direction Z and applies an upward force to the sensor case 40.

The flange 42 protrudes from the columnar portion 41 outward in the radial direction of the columnar portion 41, that is, outward in the radial direction centered on the second central axis J2. To be specific, the flange 42 protrudes from a lower end portion of the columnar portion 41 outward in the radial direction centered on the second central axis J2. As illustrated in FIG. 3, the flange 42 includes an annular portion 42a and a pair of linear portions 42b. The annular portion 42a has an annular shape that surrounds the columnar portion 41 around the second central axis J2.

The pair of linear portions 42b each extend backward from a corresponding one of two end portions of the annular portion 42a in the left-right direction X. The pair of linear portions 42b are parallel to each other. Back ends of the linear portions 42b are located further forward than the back end of the columnar portion 41.

As illustrated in FIG. 5, the facing portion 47 is connected to the flange 42 and protrudes to a position above the flange 42. The facing portion 47 includes a first portion 47a and a second portion 47b. The first portion 47a extends diagonally upward and backward from a back end portion of the linear portion 42b. The second portion 47b extends backward from a back end portion of the first portion 47a. An upper surface of the second portion 47b is perpendicular to the up-down direction Z. As illustrated in FIG. 1, the facing portion 47 is disposed at a back end portion of each of the pair of linear portions 42b. As illustrated in FIG. 3, back ends of the facing portions 47 are located behind a back end of the columnar portion 41 and in front of a back end of the flange 42, that is, a back end of the annular portion 42a.

The facing portions 47 each have a facing surface 47c, which is a curve surface, on the back side. When seen from above, the facing surface 47c has an arc-like shape such that a point on the shape is located further forward as the point moves from the inside in the left-right direction toward the outside in the left-right direction. The facing surface 47c faces backward and outward in the left-right direction.

As illustrated in FIG. 5, the dimension L1 from a lower end of the sensor case 40 to an upper end of the facing portion 47 in the up-down direction Z is smaller than the dimension L2 from the upper surface 11a of the oil passage body 11 to the lower surface of the first protrusion 53 in the up-down direction Z. In the present embodiment, the lower end of the sensor case 40 is a lower surface of the flange 42. In the present embodiment, the upper end of the facing portion 47 is the upper surface of the second portion 47b.

As illustrated in FIG. 4, in the present embodiment, the sensor case 40 is composed of three members, which are an upper case 40a, a cover 40b, and the lower case 40c. The upper case 40a is an upper part of the columnar portion 41. The grooves 41b are formed in the upper case 40a. The upper case 40a is, for example, a single member made of a resin. The lower case 40c is a lower part of the columnar portion 41. The flange 42, the facing portions 47, and the detection port 45a are included in the lower case 40c. The lower case 40c is, for example, a single member made of a metal. The cover 40b is sandwiched between the upper case 40a and the lower case 40c in the up-down direction Z.

The accommodation space 40d is formed between the lower case 40c and the cover 40b in the up-down direction Z. The accommodation space 40d is divided by the diaphragm 23 in the up-down direction Z. An upper end of the detection port 45a has an opening in a lower part of the accommodation space 40d. The sensor body 21 is disposed on the lower surface of the cover 40b in an upper part of the accommodation space 40d. The upper part of the accommodation space 40d is filled with a pressure transfer liquid. In the attached state, oil flows into the lower part of the accommodation space 40d through the detection port 45a, which is connected to the oil passage opening 12. The pressure of oil that has flowed into the lower part of the accommodation space 40d is applied to the sensor body 21 via the diaphragm 23 and the pressure transfer liquid. Thus, the sensor body 21 can measure the pressure of oil in the oil passage 11b.

The connection terminal 22 is disposed at the upper end of the columnar portion 41. The connection terminal 22 includes three connection pins 22a extending in the up-down direction Z. Although not illustrated, the connection pins 22a are connected to an external apparatus (not shown), such as an electric power supply, and electrically connect the external apparatus and the sensor body 21.

An operator attaches the oil pressure sensor 20 to the oil passage body 11 by using the oil pressure sensor attachment structure 30 as follows: while holding the oil pressure sensor 20 so that the lower end of the oil pressure sensor 20 is in contact with the upper surface 11a of the oil passage body 11, the operator moves the oil pressure sensor 20 forward and inserts the oil pressure sensor 20 from the first receiving opening 57a into the receiving portion 57 of the guide projection 50. In the present embodiment, the lower end of the oil pressure sensor 20 is the lower end of the sealing member 24. When inserting the oil pressure sensor 20 into the receiving portion 57, the operator presses the oil pressure sensor 20 against the upper surface 11a and compresses and elastically deforms the sealing member 24 in the up-down direction Z until the upper end of the facing portion 47 becomes lower than the first protrusion 53 as shown by a two-dot chain line in FIG. 5. In this state, the operator moves the oil pressure sensor 20 forward and inserts the oil pressure sensor 20 into the receiving portion 57.

As illustrated in FIG. 4, when the oil pressure sensor 20 is inserted into the receiving portion 57, the columnar portion 41 is inserted into the gap between the first protrusions 53. The upper part of the columnar portion 41 protrudes to a position above the receiving portion 57 through an upper opening of the receiving portion 57. At least a part of the flange 42 is disposed in the receiving portion 57 between the upper surface 11a of the oil passage body 11 and the first protrusions 53 in the up-down direction Z. In the present embodiment, both end portions of the annular portion 42a in the left-right direction X and the linear portions 42b are disposed between the upper surface 11a and the first protrusions 53 in the up-down direction Z. Thus, the flange 42 engages with the first protrusions 53, and upward movement of the oil pressure sensor 20 is suppressed.

As illustrated in FIG. 5, the operator moves the oil pressure sensor 20 forward until the facing portion 47 faces the recess 58 in the up-down direction Z and the back end of the facing portion 47 is located further toward the front side than the first surface 58a. In this state, when the operator releases a downward force applied to the oil pressure sensor 20, the sealing member 24 returns to its original shape and the sensor case 40 is raised by the sealing member 24. The sensor case 40 moves upward until the upper surface of the flange 42 contacts the lower surface of the first protrusion 53. When the upper surface of the flange 42 and the lower surface of the first protrusion 53 are in contact with each other, the sealing member 24 is compressed and elastically deformed in the up-down direction Z and presses the flange 42 against the first protrusions 53 from below. In the attached state, the lower surface of the flange 42 is located above the upper surface 11a of the oil passage body 11.

As the sensor case 40 moves upward, the facing portion 47 is inserted into the recess 58. Thus, the facing portion 47 is disposed in front of the first surface 58a and faces the first surface 58a. To be specific, an upper end portion of the facing portion 47 is inserted into the recess 58, and the facing surface 47c faces the first surface 58a in the front-back direction Y. Accordingly, the facing portion 47 engages with the first surface 58a, and backward movement of the oil pressure sensor 20, which has been inserted into the receiving portion 57, can be suppressed. In FIG. 5, the facing surface 47c is in contact with the first surface 58a. Moreover, forward movement of the oil pressure sensor 20 is suppressed by the second wall 52. Thus, it is possible to suppress movement of the oil pressure sensor 20 in the front-back direction Y. Through the process described above, it is possible to attach the oil pressure sensor 20 to the oil passage body 11 by using the oil pressure sensor attachment structure 30.

As described above, with the present embodiment, the flange 42 can suppress upward movement of the oil pressure sensor 20, and the facing portion 47 can suppress backward movement of the oil pressure sensor 20 and extraction of the oil pressure sensor 20 from the first receiving opening 57a. The second wall 52 can suppress forward movement of the oil pressure sensor 20. Moreover, the pair of first walls 51 or the pair of first protrusions 53 can suppress movement of the oil pressure sensor 20 in the left-right direction X.

Thus, it is possible to suppress removal of the oil pressure sensor 20 from the oil passage body 11 even if a high pressure of oil is applied to the oil pressure sensor 20 attached to the oil passage body 11. Because it is not necessary to use a screw and an attachment member, it is possible to reduce the size of the oil pressure sensor 20 and to reduce the number of components of the oil pressure sensor attachment structure 30. Accordingly, with the oil pressure sensor attachment structure according to the present embodiment 30, it is possible to suppress increase in the size of the entirety of the oil pressure controller while ensuring the attachment strength of the oil pressure sensor 20. Moreover, it is possible to suppress increase in the number of components of the oil pressure sensor attachment structure 30 and to suppress increase in the cost of manufacturing the oil pressure controller. Furthermore, it is easy to attach the oil pressure sensor 20 to the oil passage body 11, because the oil pressure sensor 20 can be attached by inserting the oil pressure sensor 20 into the receiving portion 57 and by engaging the facing portion 47 with the first surface 58a.

Movement of the oil pressure sensor 20 in the left-right direction X may be suppressed by contact of the columnar portion 41 with the first protrusions 53 or by contact of the flange 42 with the first walls 51.

For example, when the sensor case 40 is composed of a plurality of members as in the present embodiment, it may be possible to form, instead of the facing portion 47, an engagement portion, which is engageable with the guide projection 50, in a member other than a member having the detection port 45a. In the present embodiment, the upper case 40a is an example of a member other than a member having the detection port 45a. In this case, the engagement portion engages with the guide projection 50, and thereby it is possible to suppress backward movement of the oil pressure sensor 20 and extraction of the oil pressure sensor 20 from the first receiving opening 57a. However, in this case, the relative positions of the member having the engagement portion and the member having the detection port 45a may become displaced, and the relative positions of the engagement portion and the detection port 45a in the front-back direction Y may become displaced. Thus, the position of the detection port 45a relative to the oil passage opening 12 in the front-back direction Y may become displaced, and the detection precision of the oil pressure sensor 20 may decrease.

In contrast, with the present embodiment, the facing portion 47 is connected to the flange 42. The flange 42, at least a part of which is disposed between the upper surface 11a of the oil passage body 11 and the first protrusions 53 in the up-down direction Z, is formed in a lower part of the sensor case 40. Therefore, as in the present embodiment, it is easy to form the flange 42 in one of a plurality of members of the sensor case 40 having the detection port 45a. Accordingly, by forming a structure in which the facing portion 47 is connected to the flange 42, it is easy to form the detection port 45a and the facing portion 47 in a single member. Thus, it is possible to suppress displacement of the relative positions of the facing portion 47 and the detection port 45a.

In the present embodiment, the lower case 40c, in which the detection port 45a is formed, includes the flange 42 and the facing portion 47. That is, the detection port 45a and the facing portion 47 are formed in a single member, which is the lower case 40c. Therefore, it is possible to suppress displacement of the relative positions of the facing portion 47 and the detection port 45a in the front-back direction Y and to suppress displacement of the relative positions of the oil passage opening 12 and the detection port 45a in the front-back direction Y. Accordingly, with the present embodiment, it is easy to attach the oil pressure sensor 20 to the oil passage body 11 with high precision and to suppress decrease of the detection precision of the oil pressure sensor 20.

As in the present embodiment, by forming the lower case 40c from a metal, it is possible to make the lower case 40c resistant to deformation and to further suppress displacement of the relative positions of the facing portion 47 and the detection port 45a in the front-back direction Y. Thus, it is possible to further suppress displacement of the oil passage opening 12 relative to the detection port 45a in the front-back direction Y.

For example, if an engagement portion described above is formed in the upper case 40a, the engagement portion has, for example, a structure such that the engagement portion extends from the upper case 40a in the radial direction centered on the second central axis J2. In this case, the size of the sensor case 40 tends to increase in the radial direction. In contrast, with the present embodiment, the facing portion 47 is connected to the flange 42, which is disposed between the upper surface 11a of the oil passage body 11 and the first protrusions 53 in the up-down direction Z and protrudes to a position above the flange 42. Therefore, it is possible to suppress increase in the size of the sensor case 40 in the radial direction. Moreover, it is easy to simplify the structure of the facing portion 47.

With the present embodiment, the first surface 58a is an inner side surface of the recess 58, and the facing portion 47 is inserted into the recess 58 and faces the first surface 58a. Therefore, it is possible to form the first surface 58a by forming the recess 58 in the lower surface of the first protrusion 53. Accordingly, it is easy to form the first surface 58a.

With the present embodiment, the dimension L1 from the lower end of the sensor case 40 to the upper end of the facing portion 47 in the up-down direction Z is smaller than the dimension L2 from the upper surface 11a of the oil passage body 11 to the lower surface of the first protrusion 53 in the up-down direction Z. Therefore, when inserting the oil pressure sensor 20 into the receiving portion 57, it is possible to insert the oil pressure sensor 20 into a space below the first protrusion 53, that is, a space below the recess 58 without deforming the facing portion 47. Due to the presence of the sealing member 24, which applies an upward force to the sensor case 40, it is possible to insert the facing portion 47 into the recess 58 and to make the facing portion 47 face the first surface 58a by using a recovery force of the sealing member 24. Accordingly, it is easy to insert the oil pressure sensor 20 into the receiving portion 57 and to make the facing portion 47 face the first surface 58a.

For example, the facing portion 47 may be a hook that engages with the recess 58 by being elastically deformed and snap fit. In this case, however, because the facing portion 47 needs to be elastically deformable, the facing portion 47 may become deformed and extracted from the recess 58 when a force is applied to the oil pressure sensor 20. Therefore, the attachment strength of the oil pressure sensor 20 may decrease. In contrast, with the present embodiment, because the facing portion 47 can be engaged with the recess 58 without being elastically deformed, it is possible to increase the rigidity of the facing portion 47 and to suppress extraction of the facing portion 47 from the recess 58. Accordingly, it is possible to increase the attachment strength of the oil pressure sensor 20 and to obtain the oil pressure sensor attachment structure 30 having high reliability.

With the present embodiment, the facing portion 47 is formed in each of the pair of linear portions 42b, and the first surface 58a is formed in each of the pair of first protrusions 53. Therefore, by engaging the pair of facing portions 47 with the pair of first surfaces 58a, the pair of facing portions 47 can suppress backward movement of the oil pressure sensor 20 and extraction of the oil pressure sensor 20 from the first receiving opening 57a.

In the attached state, for example, if the oil pressure sensor 20 rotates about the second central axis J2, the facing portion 47 may be removed from the first surface 58a and the oil pressure sensor 20 may be extracted from the first receiving opening 57a. In contrast, with the present embodiment, the pair of linear portions 42b each extend backward from a corresponding one of the end portions of the annular portion 42a in the left-right direction X. Therefore, when the oil pressure sensor 20 is inserted into the receiving portion 57, inner side surfaces of the first walls 51 in the left-right direction and the outer side surfaces of the linear portions 42b in the left-right direction face each other. Thus, when the oil pressure sensor 20 attempts to rotate about the second central axis J2, the outer side surfaces of the linear portions 42b in the left-right direction contact the inner side surfaces of the first walls 51 in the left-right direction, and rotation of the oil pressure sensor 20 about the second central axis J2 can be suppressed. Accordingly, in the attached state, it is possible to suppress removal of the facing portion 47 from the first surface 58a and to suppress extraction of the oil pressure sensor 20 from the first receiving opening 57a.

Because the facing surface 47c, which is the back surface of the facing portion 47, is a curved surface, it is possible to suppress friction between the facing portion 47 and the guide projection 50 when inserting the oil pressure sensor 20 into the receiving portion 57. Thus, it is possible to suppress frictional wear of the facing portion 47. Moreover, it is possible to suppress contamination that may occur when a part of the facing portion 47 is abraded.

As illustrated in FIG. 5, in the attached state, the upper surface of the flange 42 is in contact with the lower surface of the first protrusion 53. In this state, the upper end of the facing portion 47 is located below the bottom surface of the recess 58 with a gap therebetween. For example, if the upper end of the facing portion 47 can contact the bottom surface of the recesses 58, when the sensor case 40 moves upward due to recovery deformation of the sealing member 24, the upper end of the facing portion 47 may contact the bottom surface of the recess 58 before the upper surface of the flange 42 contacts the lower surface of the first protrusion 53. If this occurs, the entirety of the sensor case 40 may become inclined around the facing portion 47 with respect to a horizontal surface (XY-plane), and it may not be possible to stably attach the oil pressure sensor 20. In contrast, with the present embodiment, because the upper end of the facing portion 47 does not contact the bottom surface of the recess 58, it is possible to suppress inclination of the sensor case 40 and it is possible to stably attach the oil pressure sensor 20.

Although not illustrated, in the present embodiment, in the attached state, a part of the flange 42 is disposed between the upper surface 11a of the oil passage body 11 and the second protrusion 54 in the up-down direction Z. In the present embodiment, a front part of the flange 42 is disposed between the upper surface 11a and the second protrusion 54 in the up-down direction Z. Thus, both the first protrusion 53 and the second protrusion 54 can suppress upward movement of the flange 42, and therefore it is possible to more strongly attach the oil pressure sensor 20 in the up-down direction Z.

The present invention is not limited to the embodiment described above and may have a different structure. In the following description, elements that are the same as those of the embodiment described above may be denoted by the same numerals and descriptions of such elements will be omitted as appropriate.

The first surface 58a is not particularly limited, as long as the first surface 58a is a surface of the first protrusion 53 facing forward. The first surface 58a may be a convex surface that protrudes downward from the lower surface of the first protrusion 53. The dimension L1 from the lower end of the sensor case 40 to the upper end of the facing portion 47 in the up-down direction Z may be larger than or equal to the dimension L2 from the upper surface 11a of the oil passage body 11 to the lower surface of the first protrusion 53 in the up-down direction Z. In this case, the facing portion 47 may have a structure such that the facing portion 47 engages with the first surface 58a by being elastically deformed and snap fit.

The facing portion 47 is not particularly limited, as long as the facing portion 47 is connected to the flange 42 and protrudes to a position above the flange 42. The facing portion 47 may be connected to the annular portion 42a. The facing surface 47c of the facing portion 47 may be a flat surface. In this case, the facing surface 47c is, for example, a surface that is perpendicular to the front-back direction Y. The number of each of the facing portions 47 and the first surfaces 58a may be one or three or more.

The second wall 52 may extend linearly in the left-right direction X. The second wall 52 need not be connected to the first walls 51. The sensor case 40 may be a single member.

The oil passage body 11, to which the oil pressure sensor is attached by using the oil pressure sensor attachment structure 30, is not particularly limited, as long as the oil passage body 11 has therein an oil passage in which oil flows. For example, the oil pressure sensor attachment structure 30 may be used as an attachment structure for attaching an oil pressure sensor to an oil pump.

The structures described above may be used in any appropriate combinations as long as they are not technically contradictory.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An oil pressure sensor attachment structure for attaching an oil pressure sensor to an upper surface of an oil passage body having therein an oil passage in which oil flows, the oil pressure sensor measuring a pressure of oil that flows in the oil passage,
   wherein the oil passage body has an oil passage opening, which is connected to the oil passage, in the upper surface of the oil passage body,
   wherein the oil pressure sensor includes a sensor body and a sensor case that covers the sensor body,
   wherein the sensor case includes a detection port in a lower surface thereof, the detection port being connected to the oil passage opening in a state in which the oil pressure sensor is attached to the upper surface of the oil passage body,
   the oil pressure sensor attachment structure comprising:
   a guide projection disposed on the upper surface of the oil passage body; and
   the sensor case,
   wherein the guide projection includes
      a pair of first walls that protrude upward from the upper surface of the oil passage body and that face each other in a first direction with the oil passage opening therebetween, the first direction being a horizontal direction, and
      a pair of first protrusions each of which protrudes from a corresponding one of the first walls toward the other first wall and that face each other in the first direction with a gap therebetween,
   wherein a receiving portion is provided between the first walls,
   wherein the receiving portion includes a first receiving opening that is open toward one side in a second direction that is a horizontal direction perpendicular to the first direction, and the receiving portion is capable of receiving the sensor case from the first receiving opening in the second direction,
   wherein the guide projection includes a second wall that protrudes upward from the upper surface of the oil passage body,
   wherein the second wall faces the first receiving opening in the second direction with a gap therebetween and is disposed in such a way that the oil passage opening is located between the second wall and the first receiving opening,
   wherein the sensor case includes a columnar portion that extends in an up-down direction and that is inserted into the gap between the first protrusions, a flange that protrudes from the columnar portion outward in a radial direction of the columnar portion, at least a part of the flange being disposed in the receiving portion between the upper surface of the oil passage body and the first protrusions, and a facing portion that is connected to the flange and protrudes to a position above the flange, wherein each of the first protrusions has a first surface that faces toward the other side in the second direction, and wherein the facing portion is disposed on the other side of the first surface in the second direction and faces the first surface.

2. The oil pressure sensor attachment structure according to claim 1, wherein each of the first protrusions includes a recess that is recessed upward from a lower surface the first protrusion, wherein the first surface is an inner side surface of the recess facing toward the other side in the second direction, and wherein the facing portion is inserted into the recess and faces the first surface.

3. The oil pressure sensor attachment structure according to claim 2, further comprising:

a sealing member that is disposed between the upper surface of the oil passage body and the sensor case and that has elasticity, wherein the sealing member applies an upward force to the sensor case, and wherein a dimension from a lower end of the sensor case to an upper end of the facing portion in the up-down direction is smaller than a dimension from the upper surface of the oil passage body to the lower surface of the first protrusion in the up-down direction.

4. The oil pressure sensor attachment structure according to claim 3, wherein an upper surface of the flange is in contact with the lower surface of the first protrusion, and wherein the upper end of the facing portion is located below a bottom surface of the recess with a gap therebetween.

5. The oil pressure sensor attachment structure according to claim 1, wherein the flange includes an annular portion, and a pair of linear portions each of which extends toward the one side in the second direction from a corresponding one of two end portions of the annular portion in the first direction, wherein the facing portion is disposed at an end of each of the pair of linear portions on the one side in the second direction, and wherein the first surface is disposed in each of the pair of first protrusions.

6. The oil pressure sensor attachment structure according to claim 5, wherein a surface of the facing portion on the one side in the second direction is a curved surface.

7. The oil pressure sensor attachment structure according to claim 1, wherein the guide projection includes a second protrusion that protrudes from the second wall toward the first receiving opening in the second direction, and wherein a part of the flange is disposed between the upper surface of the oil passage body and the second protrusion in the up-down direction.

* * * * *